US008796991B2

(12) United States Patent
Ohtomo

(10) Patent No.: US 8,796,991 B2
(45) Date of Patent: Aug. 5, 2014

(54) ELECTRIC CHARGING SYSTEM

(75) Inventor: Yosuke Ohtomo, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 302 days.

(21) Appl. No.: 13/426,707

(22) Filed: Mar. 22, 2012

(65) Prior Publication Data
US 2012/0249069 A1 Oct. 4, 2012

(30) Foreign Application Priority Data

Mar. 31, 2011 (JP) ................................. 2011-078294

(51) Int. Cl.
H02J 7/00 (2006.01)
(52) U.S. Cl.
USPC .......................................... 320/109; 320/137
(58) Field of Classification Search
USPC .......................................................... 320/109
See application file for complete search history.

(56) References Cited

U.S. PATENT DOCUMENTS

2007/0085494 A1* 4/2007 Takeda et al. ................. 315/316
2009/0030712 A1* 1/2009 Bogolea et al. .................... 705/1
2010/0185357 A1* 7/2010 Mizumachi ..................... 701/33

FOREIGN PATENT DOCUMENTS

JP 2009-83670 A 4/2009

* cited by examiner

Primary Examiner — Arun Williams
(74) Attorney, Agent, or Firm — McDermott Will & Emery LLP

(57) ABSTRACT

In an electric charging system, a charging cable of an electric charger is connected to an electric vehicle, and a supply voltage at the electric charger is temporarily raised and dropped. A receiving voltage at the electric vehicle rises and falls in conjunction with to the supply voltage. Accordingly, a feature point is assigned to each of electric charger data obtained by applying a filtering process to the supply voltage and vehicle data obtained by applying a filtering process to the receiving voltage. Then a time lag between the electric charger data and the vehicle data due to filtering processing is calculated based on the feature points. Upon determining an insulation failure and the like between the electric charger and the electric vehicle, the electric charger data and the vehicle data are synchronized based on the time lag and then compared.

8 Claims, 7 Drawing Sheets

ELECTRIC CHARGING SYSTEM

CROSS REFERENCES TO RELATED APPLICATIONS

The present application claims priority from Japanese Patent Application No. 2011-078294 filed on Mar. 31, 2011, the entire contents of which are hereby incorporated by reference.

BACKGROUND OF THE INVENTION

1. Field of the Invention

The present invention relates to an electric charging system that connects an electric charger and an electric vehicle via a charging cable and charges an electric storage device mounted on the electric vehicle.

2. Description of the Related Art

In recent years, electric vehicles that are equipped with an electric motor for propulsion have been under development. The electric vehicle is equipped with an electric storage device such as battery. Upon charging the electric storage device, a charging cable extending from an electric charger is connected to a charging port of the electric vehicle (see, for example, Japanese Unexamined Patent Application Publication No. 2009-83670). Furthermore, in the field of hybrid electric vehicles that are equipped with an engine and an electric motor for propulsion, so called a plug-in type vehicle is under development whose electric storage device can be charged with an electric charger.

Since supply power from the electric charger to the electric vehicle has a high voltage and a high capacity, it is necessary to monitor an insulation failure, a breaking of the charging cable and the like in order to prevent electric leakage or the like and secure safety upon charging. Examples of the monitoring method of the insulation failure and the like includes the comparison of a supply voltage of the electric charger and a receiving voltage of the electric vehicle and the comparison of a supply current of the electric charger and a receiving current of the electric vehicle. If there is a large difference between the supply voltage and the receiving voltage or between the supply current and the receiving current, there is a possibility that electric power flows into a system other than the electric vehicle, and thus it is determined that there occurs an insulation failure or the like.

Upon the detection of an insulation failure or the like, voltage data and current data output by a voltage sensor and a current sensor are used. When these data are used, it is common to eliminate noise effects by applying a filtering process such moving averaging and weighted moving averaging. However, there is a time lag in the filtered voltage data or the filtered current data, a simple comparison of the voltage data or the like between the electric charger and the electric vehicle may cause an erroneous determination of an insulation failure or the like. In other words, if there is a time lag between the electric charger and the electric vehicle, but the data thereof are not synchronized, there may be a big difference in the data between the electric charger and the electric vehicle although no insulation failure or the like occurs, or a difference may not be observed in the data between the electric charger and the electric vehicle although there occurs an insulation failure or the like.

SUMMARY OF THE INVENTION

The present invention aims to correctly determine whether or not a conduction state between an electric charger and an electric vehicle is normal.

An aspect or the present invention provides an electric charging system that connects an electric charger and an electric vehicle via a charging cable and charges an electric storage device mounted on the electric vehicle, the electric charging system including: a supply-side processing unit for calculating supply-side processed data by applying a predetermined filtering process to a supply voltage, a supply current or a supply power in the electric charger; a receiving-side processing unit for calculating receiving-side processed data by applying a predetermined filtering process to a receiving voltage, a receiving current or a receiving power in the electric vehicle; a feature point assigning unit for assigning a feature point to the supply-side processed data and the receiving-side processed data by altering at least any one of the supply voltage, the supply current, the receiving voltage and the receiving current; a data synchronizing unit for synchronizing the supply-side processed data and the receiving-side processed data based on the feature point of the supply-side processed data and the receiving-side processed data; and a determination unit for determining whether or not a conduction state between the electric charger and the electric vehicle is normal.

Preferably, the filtering process used by the supply-side processing unit and the filtering process used by the receiving-side processing unit should be different.

Preferably, the electric charging system should include a charging control unit that has a full-charging mode for charging the electric storage device up to a first supply power and a pre-charging mode for charging the electric storage device up to a second supply power that is smaller than the first supply power, and the feature point assigning unit should assign a feature point to the supply-side processed data and the receiving-side processed data in the pre-charging mode performed in prior to the full-charging mode.

Preferably, the feature point assigning unit should assign the feature point to the supply-side processed data and the receiving-side processed data by altering the supply current or the receiving current.

Preferably, the data synchronizing unit should calculate a time lag between the supply-side processed data and the receiving-side processed data based on the feature point and synchronize the supply-side processed data and the receiving-side processed data based on the time lag.

Preferably, the electric charger should be provided with the supply-side processing unit, the receiving-side processing unit, the feature point assigning unit, the data synchronizing unit and the determination unit.

Preferably, the receiving voltage, the receiving current or the receiving power in the electric vehicle should be sent to the receiving-side processing unit via a communication line in the charging cable.

According to the present invention, the feature point is assigned to the supply-side processed data and the receiving-side processed data by altering at least the one of the supply voltage, the supply current and the receiving voltage, whereby the supply-side processed data and the receiving-side processed data can be synchronized based on the feature point. As a result, is possible to properly compare the supply-side processed data and the receiving side processed data and correctly determine whether or not the conduction state between the electric charger and the electric vehicle is normal.

DESCRIPTION OF THE PREFERRED EMBODIMENTS

Figure 1:
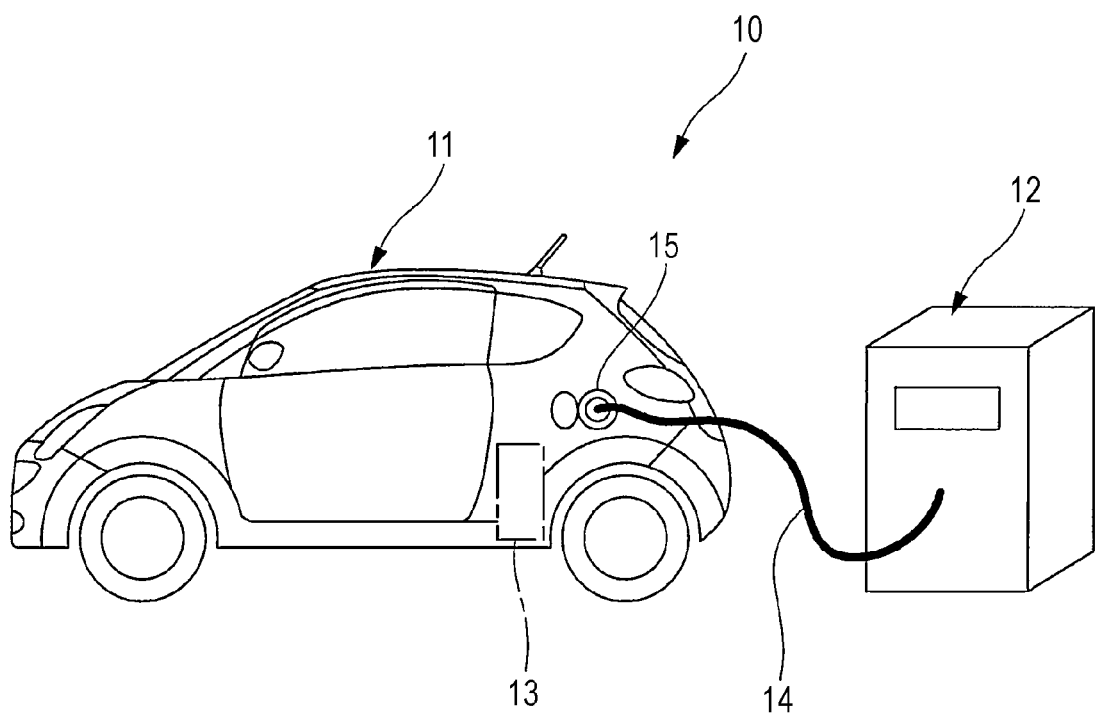
FIG. 1 is a schematic diagram showing a case in which charging is preformed with an electric charging system according to an embodiment of the present invention.
Figure 2:
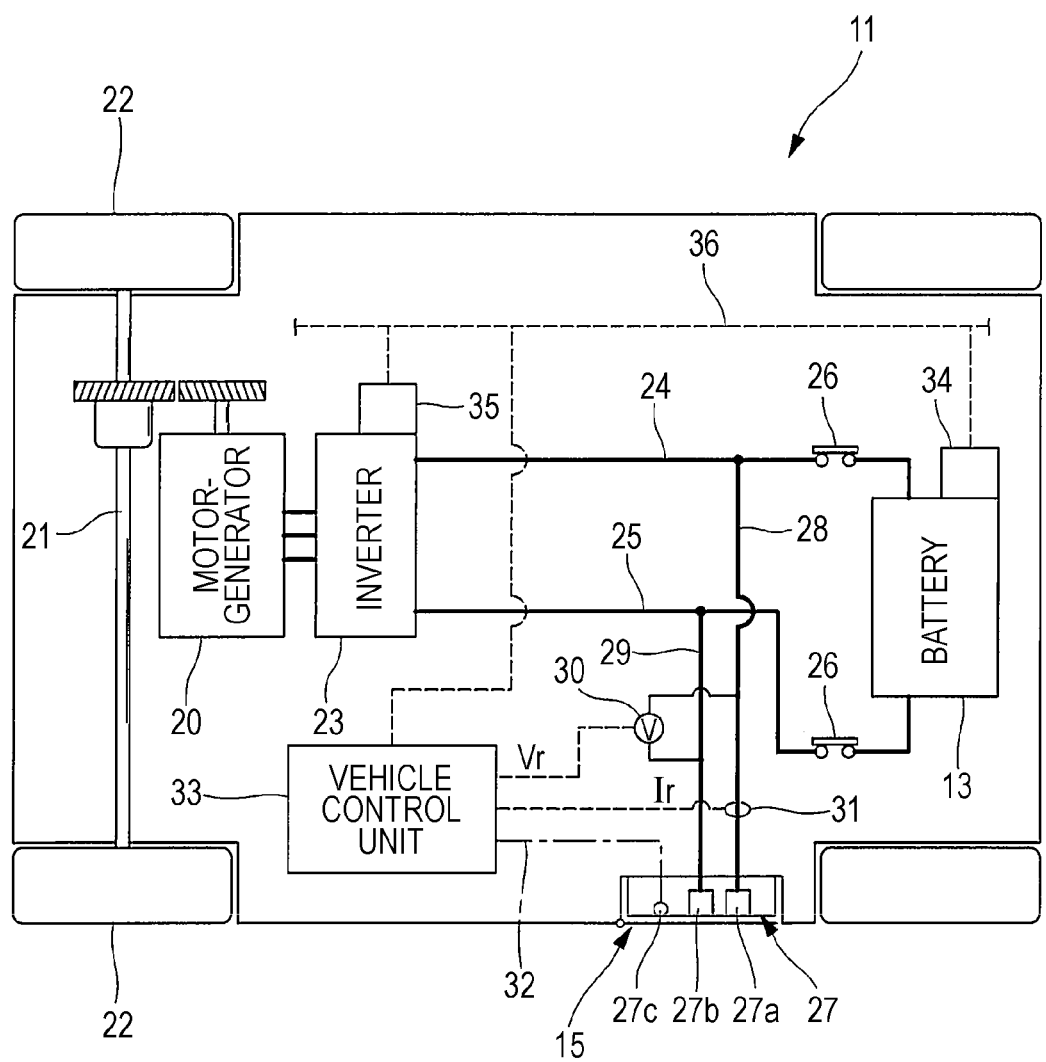
FIG. 2 is a schematic diagram showing an internal structure of an electric vehicle constituting the electric charging system.
Figure 3:
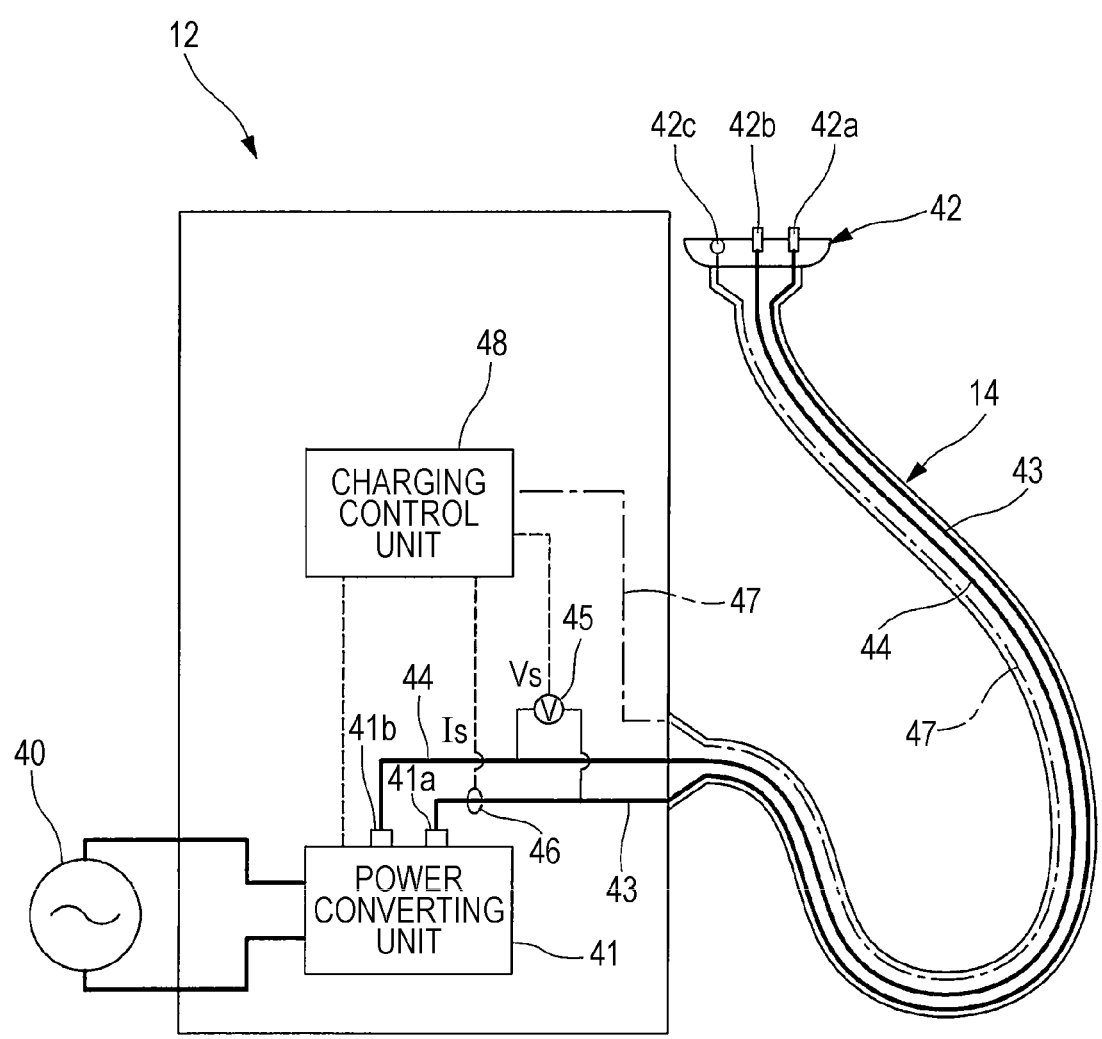
FIG. 3 is a schematic diagram showing an internal structure of an electric charger constituting the electric charging system.

An embodiment of the present invention will hereunder be described with reference to the drawings. FIG. 1 is a schematic diagram showing a case in which charging is preformed with an electric charging system 10 according to an embodiment of the present invention. FIG. 2 is a schematic diagram showing an internal structure of an electric vehicle 11 constituting the electric charging system 10. FIG. 3 is a schematic diagram showing an internal structure of an electric charger 12 constituting the electric charging system 10. As shown in FIG. 1 the electric vehicle 11 is provided with a battery 13 as an electric storage device. When the battery 13 is charged, a charging cable 14 of the electric charger 12 is connected to a charging port 13 of the electric vehicle 11. The electric charger 12 charges the battery 13 to a predetermined state-of-charge (SOC), controlling a charging current and a charging voltage to be supplied to the electric vehicle 11.

As shown in FIG. 2, the electric vehicle 11 includes a motor-generator 20 or propulsion that is connected to drive wheels 22 via a drive axle 21. The motor-generator 20 is connected to the battery 13 via an inverter 23 that bidirectionally converts DC power and AC power. The battery 13 and the inverter 23 are connected by current carrying lines 24 and 25. Each of the current carrying lines 24 and 25 has a main relay 26. The charging port 15 disposed at a side of the vehicle body is provided with a power receiving connector 27. The power receiving connector 27 has a pair of power receiving terminals 27a and 27b. The power receiving terminal 27a is connected to the current carrying line 24, which is disposed on a positive electrode side, via a power receiving line 28. The power receiving terminal 27b is connected to the current carrying line 25, which is disposed on a negative electrode side, via a power receiving line 29. The electric vehicle 11 has a voltage sensor 30 that detects a voltage of the power receiving lines 28 and 29, that is, a receiving voltage Vr, as well as a current sensor 31 that detects a current of the power receiving line 28, that is, a receiving current Ir. The power receiving connector 27 has a signal terminal 27c that is connected to a communication line 32. The electric vehicle 11 includes a vehicle control unit 33 for integrally controlling the entire vehicle, a battery control unit 34 for controlling the battery 13, and a motor control unit 35 for controlling the inverter 23. The control units 33 to 35 are connected to each other via a communication line 36. Each of the control units 33 to 35 is equipped with a CPU, a memory and the like.

As shown in FIG. 3, the electric charger 12 has a power converting unit 41 that converts AC power from an external power source 40 to DC power for charging. The power converting unit 41 includes a rectifier circuit, an electric transformer, a switching circuit and the like. At an end of the charging cable 12 of the electric charger 14 is provided a power supply connector 42 that is attachable and detachable with respect to the power receiving connector 27. The power supply connector 42 has a pair of power supply terminals 42a ant 42b that correspond to the power receiving terminals 27a and 27b of the power receiving connector 27. The power supply terminal 42a is connected to a positive electrode terminal 41a of the power converting unit 41 via a power supply line 43, while the power supply terminal 42b is connected to a negative electrode terminal 41b of the power converting unit 41 via a power supply line 44. The electric charger 12 has a voltage sensor 45 that detects a voltage of the power supply lines 43 and 44, that is, a supply voltage Vs, as well as a current sensor 46 that detects a current of the power supply line 43, that is, a supply current Is. The power supply connector 42 has a signal terminal 42c that is connected to a communication line 47. The electric charger 12 includes a charging control unit 48 that is equipped with a CPU, a memory and the like. The charging control unit 48 transmits a control signal to the power converting unit 41.

Figure 4:
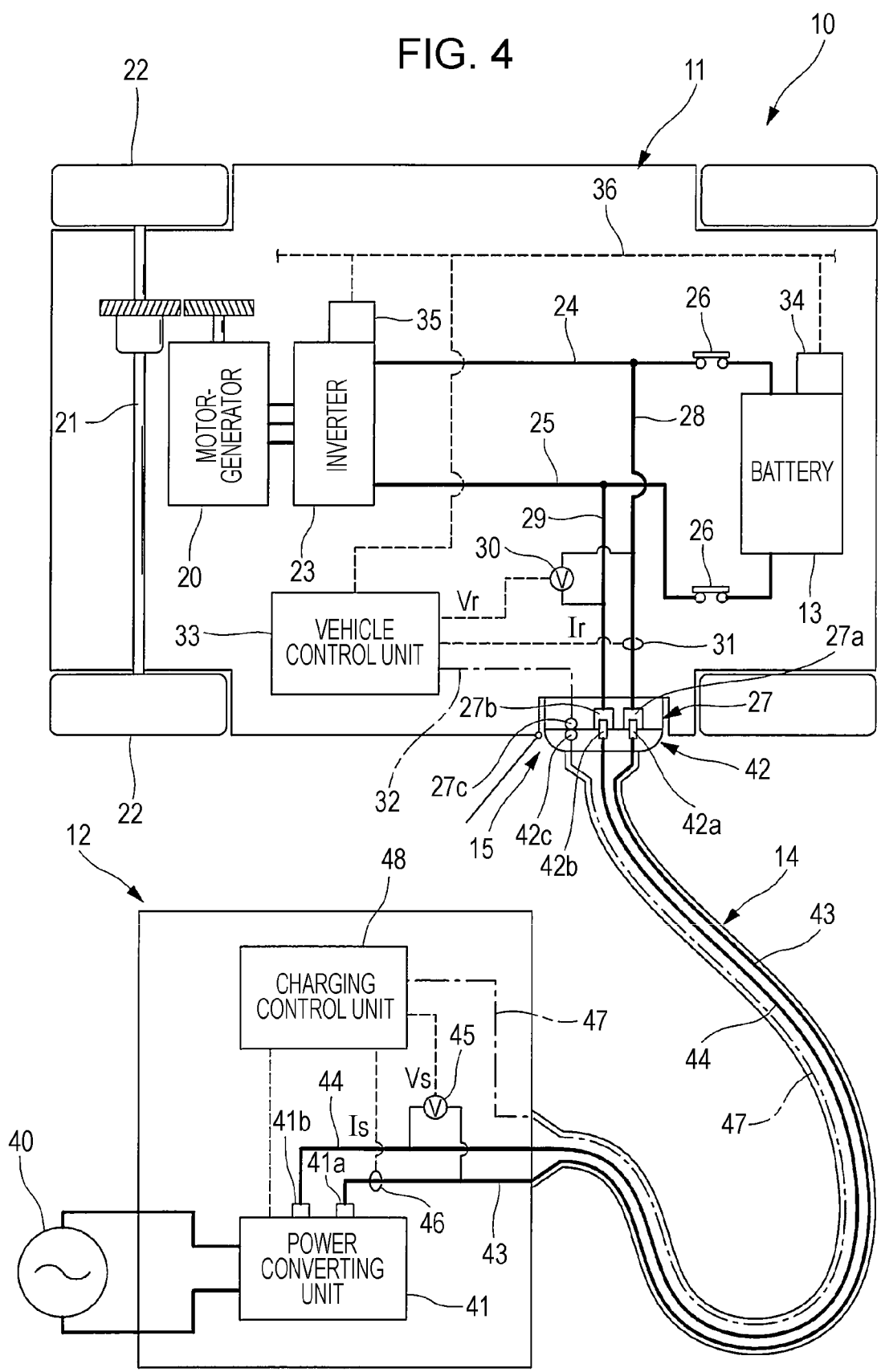
FIG. 4 is a schematic diagram showing a state where a charging cable of the electric charger is connected to a charging port of the electric vehicle.

FIG. 4 is a schematic diagram showing a state where the charging cable 14 of the electric charger 12 is connected to the charging port 15 of the electric vehicle 11. As shown in FIG. 4, connecting the power supply connector 42 of the charging cable 14 to the power receiving connector 27 of the charging port 15 causes a state where the power converting unit 41 and the battery 13 are connected to each other via the power supply lines 43 and 44 and the power receiving lines 28 and 29. Furthermore, connecting the power supply connector 42 of the charging cable 14 to the power receiving connector 27 of the charging port 15 causes a state where the vehicle control unit 33 and the charging control unit 48 are connected to each other via the communication lines 32 and 47. During charging when the electric charger 12 and the electric vehicle 11 are connected in this manner, various pieces of battery information such as current instruction value, voltage instruction value, actual current value, actual voltage value, cell temperature and state of charge (SOC) are transmitted from the battery control unit 34 to the vehicle control unit 33, and then transmitted from the battery control unit 33 to the battery control unit 48 via the communication lines 32 and 47. Then the battery control unit 48 outputs a control signal to the power converting unit 41 so as to obtain a supply current Is corresponding to the current instruction value and a supply voltage Vs corresponding to the voltage instruction value, thereby charging the battery 13 to a predetermined SOC. While the electric vehicle 11 instructs the electric charger 12 on the charging current and the like in the above explanation, the present invention is not limited to this. Alternatively, the charging control unit 48 of the electric charger 12 may set the charging current and the like based on the SOC and the like.

Figure 5A:
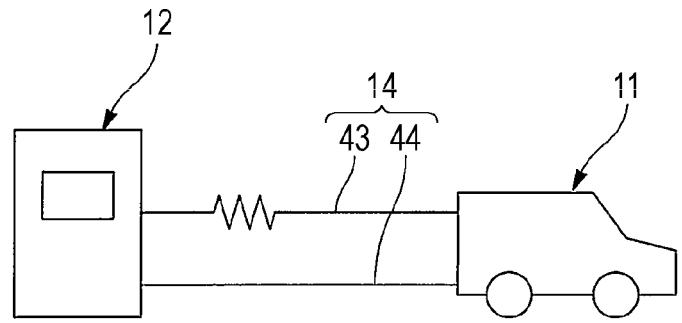
FIGS. 5A to 5C are explanatory diagrams exemplifying failure states accompanied by electric leakage or heat.
Figure 5B:
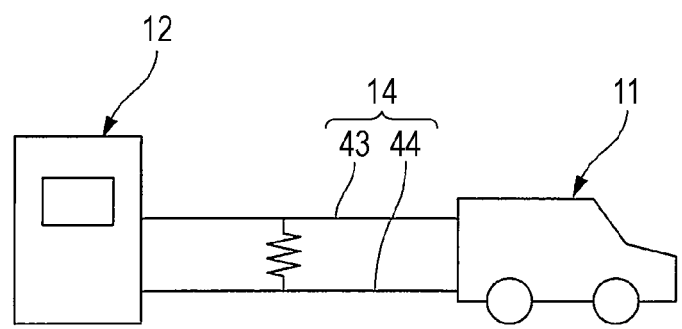
Figure 5C:
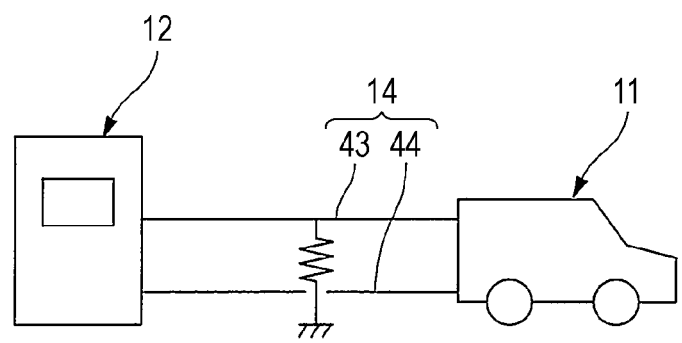

Since the electric charger 12 provides the electric vehicle 11 with a high-voltage and high-capacity power (for example, DC 400 V, 100 A) during charging in the above manner, it is important to prevent an electric leakage, heat and the like by monitoring an insulation failure, a breaking of the power supply lines 43 and 44 and the like. Thus, the charging control unit 48 compares the receiving voltage Vr and the supply voltage Vs during charging. If there is a difference therebetween that exceeds a predetermined amount, the charging control unit 48 determines that there occurs a breaking of the power supply line 43 or 44, a connection failure of the connector 27 or 42 or the like, as shown in FIG. 5A, and halts charging. The charging control unit 48 also compares the receiving current Ir and the supply current Is. If there is a difference therebetween that exceeds a predetermined amount, the charging control unit 48 determines that there occurs a short circuit or an earth fault between the power supply line 43 and 44, as shown in FIGS. 5B and 5C, and halts charging. FIGS. 5A to 5C are explanatory diagrams exemplifying failure states accompanied by electric leakage or heat. The charging control unit 48, which serves as a determination unit of the present invention, compares the receiving current Vr and the supply current Vs as well as the receiving current Ir and the supply current Is in this manner so as to determine whether the conduction state between the electric charger 12 and the electric vehicle 11 is normal. However, in order to use the receiving current Vr, the supply current Vs, the receiving current Ir and the supply current Is detected by the voltage sensors 30 and 45 and the current sensors 31 and 46, it is necessary to eliminate noise effects by applying a filtering process such as moving averaging and weighted moving averaging.

Figure 6:
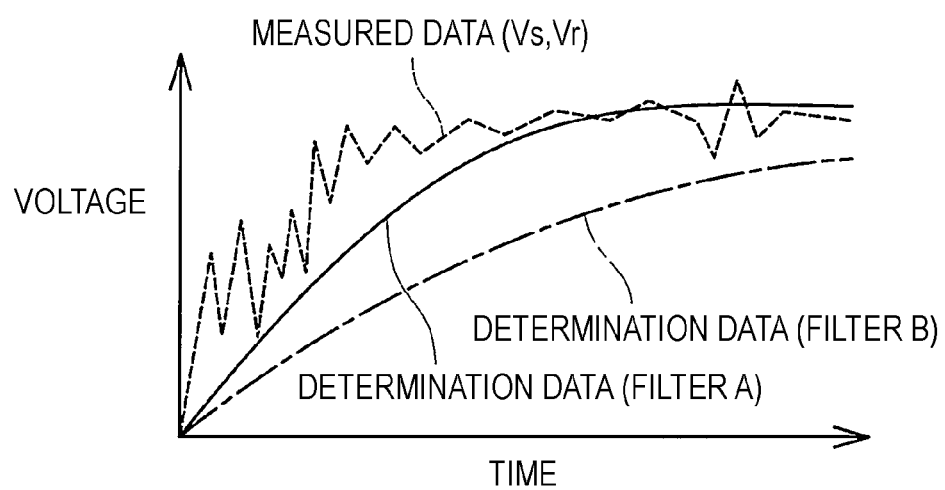
FIG. 6 is a diagram showing an effect of filtering processing on a receiving voltage and a supply voltage.

FIG. 6 is a diagram showing an effect of filtering processing on the receiving voltage Vr and the supply voltage Vs. Note that filtering processing has similar affects on the receiving current Ir and the supply current Is. As shown FIG. 6, when measured data detected by the voltage sensors 30 and 45 are subjected to filtering processing and then further processed to obtain determination data, a time lag occurs between the measured data and the determination data. The time lag due to filtering processing changes depending on the contents of the applied filtering process. Thus, if a filtering process applied to the receiving voltage Vr or the receiving current Ir of the electric vehicle differs from a filtering process applied to the supply voltage Ds or the supply current Ir of the electric charger, a time lag occurs between vehicle data (receiving-side processed data) Dr based on the receiving voltage Vr and the receiving current Ir and electric charger data (supply-side processed data) Ds based on the supply voltage Vs and the supply current Is. Therefore, in order to correctly determine an insulation failure or a breaking by comparing the vehicle data Dr and the electric charger Ds, it is necessary to determine a time lag and synchronize the vehicle data Dr and the electric charger Ds before comparing them. In the present embodiment, the charging control unit 48 serves as a receiving-side processing unit for calculating the vehicle data Dr as well as a supply-side processing unit for calculating the electric charger data Ds. Furthermore, the charging control unit 48 receives the receiving voltage Vr and the receiving current Ir detected at the electric vehicle from the vehicle control unit 33 via the communication line 32 and 47.

The charging control unit 48, which serves as a charging control unit of the present invention, performs the pre-charging mode before the full-charging mode for charging the battery 13 up to a first supply power. In the pre-charging mode, she battery 13 is charged up to a second supply power that is smaller than the first supply power. In other words, the charging control unit 48 firstly performs the pre-charging mode with a small supply power, and then the full-charging mode with a large supply power. In the pre-charging mode, the charging control unit 48 detects a time lag between the supply-side processed data and the receiving-side processed data, and synchronizes them in the full-charging mode based on the time lag.

Figure 7:
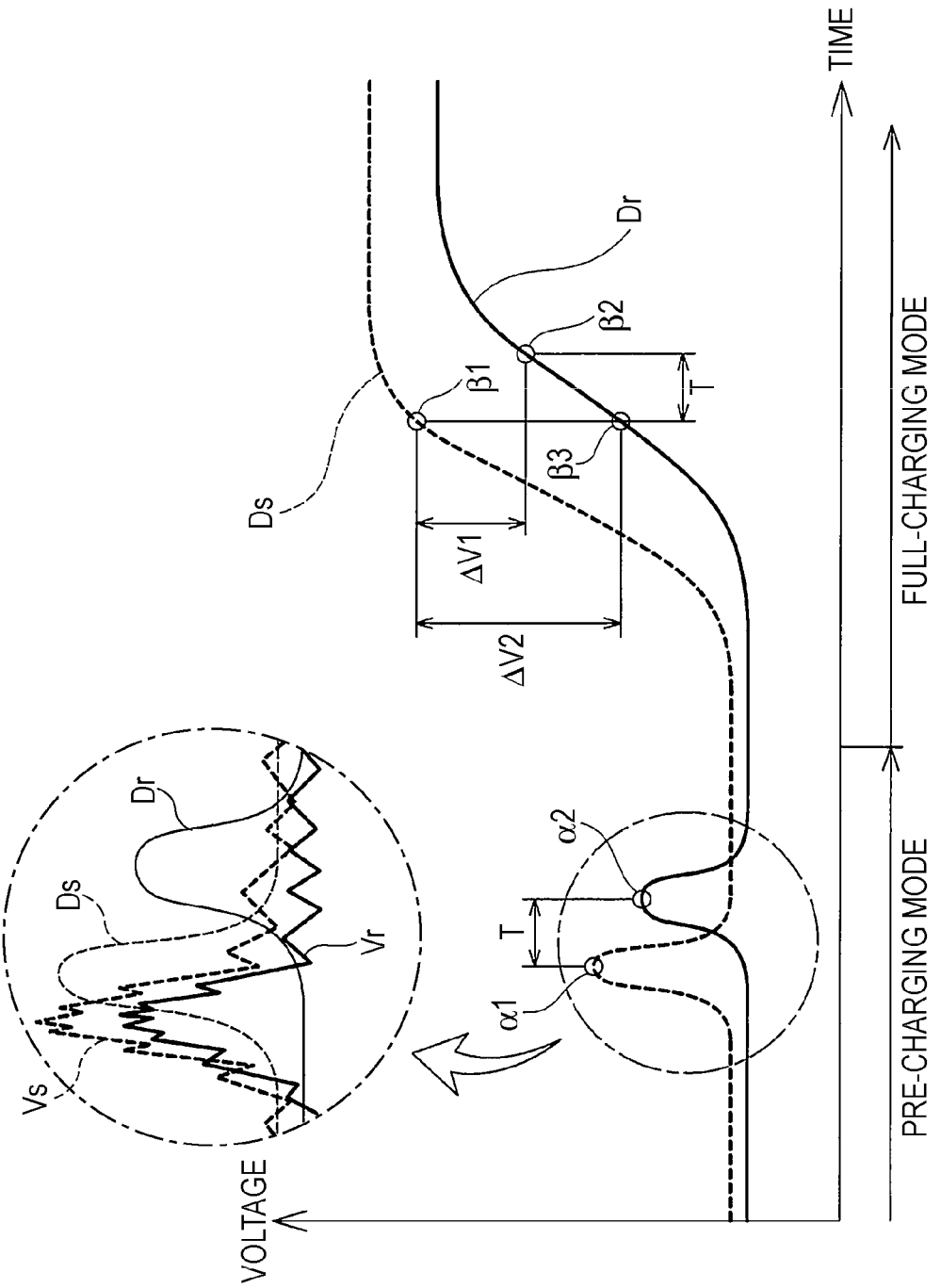
FIG. 7 is a diagram showing a change in the supply-side processed data and the receiving-side processed data in a pre-charging mode and a full-charging mode.

FIG. 7 is a diagram showing a change in the electric charger data Ds and the vehicle data Dr in the pre-charging mode and the full-charging mode. As shown in FIG. 7, the charging control unit 48, which serves as a feature point assigning unit of the present invention, temporarily raises and drops the supply voltage Vs in the pre-charging mode using the power converting unit 41. Since the power receiving lines 28 and 29 are connected to the power supply lines 43 and 44, the receiving voltage Vr temporarily rises and falls in conjunction with the supply voltage Vs at a same timing, as shown in an enlarged portion of FIG. 7. Accordingly, the supply voltage data Ds which is obtained by applying a filtering process to the supply voltage Vs is represented with a curve having an upward convex, while the vehicle data Dr which is obtained by applying a filtering process to the receiving voltage Vr is also represented with a curve having an upward convex. In other words, changing the supply voltage Vs assigns a feature point α1 to the electric charger data Ds and a feature point α2 to the vehicle data Dr. The supply voltage Vs is changed by, for example, artificially changing the supply current Is using the power converting unit 41.

Since the feature point α1 assigned to the electric charger data Ds and the feature point α2 assigned so the vehicle data Dr has a same timing, as described above, the charging control unit 48, which servers as a data synchronizing unit of the present invention, measures a temporal distance between the feature points α1 and α2 to calculate a time lag T between the electric charger data Ds and the vehicle data Dr due to the filtering processing (for example, 0.5 seconds). Upon the determination of an insulation failure, a breaking or the like in the full-charging mode, the electric charger data Ds (β1) and the vehicle data Dr (β2) are compared with the time lag T being taken into account. If the electric charger Ds (β1) and the vehicle data Dr (β3) that are output at a same time point, an erroneous determination is made that there is a large difference of ΔV2 between the electric charger data Ds and the vehicle data Dr. Thus, the vehicle data Dr and the electric charger data Ds are synchronized based on the time lag T, whereby the electric charger data Ds (β1) and the vehicle data Dr (β2) can be compared. As a result, a difference ΔV1 between the electric charger Ds and the vehicle data Dr can be properly recognized, and thus an insulation failure, a breaking and the like can be correctly determined.

In the above explanation, the receiving voltage Vs is changed in accordance with the artificially-changed supply voltage Vs. However, the present invention is not limited to this. Alternatively, the receiving voltage Vr may be artificially changed and the supply voltage Vs may be changed in accordance with the artificially-changed receiving voltage Vr. In this case, the receiving voltage Vr can be artificially changed by temporarily actuating an electric load installed in the electric vehicle 11 such as an electric heater. Further, while she supply voltage Vs is temporarily raised and dropped in the above explanation, the present invention is not limited to this. Alternatively, the raised supply voltage Vs may be maintained. Furthermore, the supply voltage Vs and the receiving voltage vr are raised in the above explanation, the present invention is not limited to this. Alternatively, the supply voltage Vs and the receiving voltage Vr may be lowered. Furthermore, while the above description uses inflection points of the electric charger data Ds and the vehicle data Dr as the feature points α1 and α2, the present invention is non limited to this. Alternatively, a feature point may be set at a point at where a predetermined voltage change amount or a voltage change speed is exceeded (or undershot) or a point at where a predetermined voltage value is exceeded (or undershot). Furthermore, an inflection point may be identified by changing the supply current instead of the supply voltage. For example, the inflection point can be identified by monitoring a degree of rise in an operation where, for example, the supply current is raised to a predetermined current value in a relatively short time and then maintained.

The case shown in FIG. 7 compares the electric charger data Ds which is obtained by applying a filtering process to the supply voltage Vs and the vehicle data Dr which is obtained by applying a filtering process to the receiving voltage Vr, but the present invention is not limited to this. Alternatively, as described above, the electric data Ds which is obtained by applying a filtering process to the supply current Is and the vehicle data Dr which is obtained by applying a filtering process to the receiving current Ir may be compared. In this case, a feature point may be assigned to the electric charger data Ds and the vehicle data Dr by altering the supply current Is and the receiving current Ir, or by altering the supply voltage Vs and the receiving voltage Vr. Furthermore, in the above explanation, the vehicle data Dr which is obtained by applying a filtering process to the receiving voltage Vr or the receiving current Is at the electric vehicle and the electric charger data Ds which is obtained by applying a filtering process to the supply voltage Vs or the supply current Ir at the electric charger in order to determine an insulation failure, a breaking and the like. However, the present invention is not limited so this. Alternatively, the vehicle data Dr that is obtained by applying a filtering process to a receiving power Wr at the electric vehicle (Wr=Ir×Vr) and the electric charger data Ds that is obtained by applying a filtering process to a supply power Ws at the electric charger (Ws=Is×Vs). In this case, again, a feature point may be assigned to the electric charger data Ds and the vehicle data Dr by altering the supply current Is and the receiving current Ir, or by altering the supply voltage Vs and the receiving voltage Vr.

The present invention is not limited to the aforementioned embodiment, and permits various modifications and alterations within the technical scope of the invention. In the above embodiment, the charging control unit 48 in the electric charger 12 serves as the supply-side processing unit, receiving-side processing unit, feature point assigning unit, data synchronizing unit, determination unit and charging control unit. However, the present invention is not limited to this. For example, the vehicle control unit 33 in the electric vehicle 11 may serves as the charging control unit 48 in the electric charger 12 serves as the supply-side processing unit, receiving-side processing unit, feature point assigning unit, data synchronizing unit, determination unit and charging control unit. Further alternatively, the charging control unit 48 and the vehicle control unit 33 may share the functions of the charging control unit 48 in the electric charger 12 serves as the supply-side processing unit, receiving-side processing unit, feature point assigning unit, data synchronizing unit, determination unit and charging control unit.

Further, moving averaging and weighted moving averaging are referred to as a filtering process for calculating the vehicle data Dr and the electric charger data Ds, but the present invention is not limited to this. Besides, filtering may be applied in a hardware sense using an electric circuit or in a software sense using a program. Furthermore, the illustrated electric vehicle 11 is an electric vehicle which only has the motor-generator 20 for propulsion, but may be a hybrid-type electric vehicle that includes a motor-generator and an engine for propulsion. Further, the battery 13 including a lithium-ion rechargeable battery, a nickel metal hydride rechargeable battery or the like is used as the electric storage device, but the present invention is not limited to this. Alternatively, a capacitor such as a lithium-ion capacitor and an electric double layer capacitor may be used as the electricity storage device. Furthermore, the electric charger 12 in the above explanation is a conductive-type charger whose charging cable 14 is equipped with the power supply connector 42 of contact type, but the present invention is not limited to this. Alternatively, an inductive-type charger may be used whose charging cable is equipped with a power supply connector of non-contact type.

What is claimed is:

1. As electric charging system that connects an electric charger and an electric vehicle via a charging cable and charges an electric storage device mounted on the electric vehicle, the electric charging system comprising:
    a supply-side processing unit for calculating supply-side processed data by applying a predetermined filtering process to a supply voltage, a supply current or a supply power in the electric charger;
    a receiving-side processing unit for calculating receiving-side processed data by applying a predetermined filtering process to a receiving voltage, a receiving current or a receiving power in the electric vehicle;
    a feature point assigning unit for assigning a feature point to the supply-side processed data and the receiving-side processed data by altering at least any one of the supply voltage, the supply current, the receiving voltage and the receiving current;
    a data synchronizing unit for synchronizing the supply-side processed data and the receiving-side processed data based on the feature point of the supply side processed data and the receiving-side processed data; and
    a determination unit for determining whether or not a conduction state between the electric charger and the electric vehicle is normal.

2. The electric charging system according to claim 1, wherein the filtering process used by the supply-side processing unit and the filtering process used by the receiving-side processing unit are be different.

3. The electric charging system according to claim 1 further comprising:
    a charging control unit that has a full-charging mode for charging the electric storage device up to a first supply power and a pre-charging mode for charging the electric storage device up to a second supply power that is smaller than the first supply power, wherein the feature point assigning unit assigns a feature point to the supply-side processed data and the receiving-side processed data in the pre-charging mode performed in prior to the full-charging mode.

4. The electric charging system according to claim 2 further comprising:
    a charging control unit that has a full-charging mode for charging the electric storage device up to a first supply power and a pre-charging mode for charging the electric storage device up to a second supply power that is smaller than the first supply power, wherein the feature point assigning unit assigns a feature point to the supply-side processed data and the receiving-side processed data in the pre-charging mode performed in prior to the full-charging mode.

5. The electric charging system according to claim 1, wherein the feature point assigning unit assigns the feature point to the supply-side processed data and the receiving-side processed data by altering the supply current or the receiving current.

6. The electric charging system according to claim 1, wherein the data synchronizing unit calculates a time lag between the supply-side processed data and the receiving-side processed data based on the feature point and synchronizes the supply-side processed data and the receiving-side processed data based on the time lag.

7. The electric charging system according to claim 1, wherein the electric charger is provided with the supply-side processing unit, the receiving-side processing unit, the feature point assigning unit, the data synchronizing unit and the determination unit.

8. The electric charging system according to claim 7, the receiving voltage, the receiving current or the receiving power in the electric vehicle are to the receiving-side processing unit via a communication line in the charging cable.

* * * * *